United States Patent [19]

Nolte

[11] Patent Number: 4,732,772

[45] Date of Patent: Mar. 22, 1988

[54] CHEESECAKE FILLING MIX AND PROCESS

[75] Inventor: James V. Nolte, Godfrey, Ill.

[73] Assignee: Blanke Baer/BoweyKrimko Corp., Fenton, Mo.

[21] Appl. No.: 905,504

[22] Filed: Sep. 9, 1986

[51] Int. Cl.$^4$ .................. A23L 1/04; A23C 13/14; A23C 9/154

[52] U.S. Cl. .................. 426/573; 426/578; 426/582; 426/586; 426/588

[58] Field of Search ............ 426/578, 582, 586, 588, 426/573

[56] References Cited

U.S. PATENT DOCUMENTS

| | | | |
|---|---|---|---|
| 3,455,698 | 7/1969 | Vakaleris | 426/580 |
| 3,666,493 | 5/1972 | Bluemke | 426/578 |
| 4,058,636 | 11/1977 | Igoe | 426/578 |
| 4,163,806 | 8/1979 | Callen et al. | 426/582 |
| 4,312,891 | 1/1982 | Eisfeldt | 426/582 |
| 4,347,258 | 8/1982 | Merkenich | 426/586 |
| 4,425,369 | 1/1984 | Sakamoto et al. | 426/582 |
| 4,427,709 | 1/1984 | Guhl et al. | 426/578 |
| 4,434,184 | 2/1984 | Kharrazi | 426/40 |
| 4,594,255 | 6/1986 | Wilson | 426/578 |

FOREIGN PATENT DOCUMENTS

3005866  8/1981  Fed. Rep. of Germany ...... 426/582

*Primary Examiner*—Jeanette Hunter
*Attorney, Agent, or Firm*—Woodard, Emhardt, Naughton, Moriarty & McNett

[57] ABSTRACT

A complete, ready-to-use cheesecake filling mix that is storable for long periods of time at refrigerated or frozen temperatures prior to use without degradation of the mixture product, and which, upon aeration by whipping and upon baking, produces a premium quality cheesecake dessert filling, comprising a homogeneous mixture of milk, cream, whole eggs, sugar, nonfat dry milk, sodium caseinate, salt, modified starch, locust bean gum, xanthan gum, mono and diglycerides, sodium tripoly phosphate, citric acid, phosphoric acid, acetic acid and water.

9 Claims, No Drawings

CHEESECAKE FILLING MIX AND PROCESS

The disclosed invention relates to a complete, ready-to-use cheesecake dessert filling mix and a process for producing the same, and more specifically to such a filling mix that can be stored for long periods of time at refrigerated or freezing temperatures without product degradation, and yet produce a premium quality cheesecake dessert filling. The dairy based filling mix can be prepared without the use of dairy intermediates, such as sour cream, cream cheese, cottage cheese and the like, but rather directly obtains its dairy content from milk and cream.

BACKGROUND OF THE INVENTION

Various cheesecake dessert filling mixes are known that are intended to provide the end user with the convenience of a ready-to-use cheesecake dessert filling mix that is storable for a period of time prior to use without product degradation and that reduces the efforts required by the end user to produce a suitable cheesecake-like dessert filling. Such prior art mixes include those that are substantially dry powder mixes that require mere hydration before use, such as those disclosed in U.S. Pat. No. 3,455,698 issued to Vakaleris, and U.S. Pat. No. 4,427,709 issued to Guhl. In U.S. Pat. No. 4,312,891 issued to Eisfeldt, there is described a self-storable thixotropic cheesecake dessert filling mix that is pourable at room temperatures directly from the product container into a suitable cheesecake crust to produce a cheesecake-like dessert without further baking after the filling jells following a period of refrigeration.

However, the price paid for the convenience offered by the storable, ready-to-use cheesecake filling mixes of the prior art has been the inability heretofore to produce from prepared filling mixes a premium quality cheesecake filling comparable to cheesecake fillings made from fresh ingredients. By premium quality is meant the superior taste, aroma, body and appetizing appearance of cheesecake dessert fillings that are prepared from conventional cheesecake staples, such as whole eggs, sugar, and the like, which can be aerated by whipping and then oven baked in a conventional pastry or sweet crumb crust.

Applicant has discovered a novel mixture of ingredients and a novel process for producing the same that provides a totally complete and ready-to-use premium quality cheesecake filling mix, which includes, inter alia, cream, whole eggs, and sugar, that may be stored at refrigerated or freezing temperatures for long periods of time without product degeneration before it is used to produce a premium quality cheesecake dessert filling. The Applicant's novel product offers convenience, while at the same time including the necessary ingredients to produce a premium quality cheesecake dessert filling. The Applicant's novel product also allows the preparation of cheesecake filling with cream and milk being the predominant ingredients, without the need for intermediate dairy products, such as cream cheese or sour cream being prepared in advance.

In its refrigerated or frozen storage state, Applicant's novel cheesecake filling mix is ideally suited for bulk distribution to institutional or commercial establishments, or for placement in smaller quantities in the frozen foods section of local grocery stores. End users of Applicant's novel cheesecake filling mix may prepare a premium quality cheesecake dessert filling by the simple expediencies of aerating a desired amount of the novel mix by mechanical whipping to a degree sufficient to impart desired fluffiness in the end dessert filling, and by then oven baking the aerated filling mix in a conventional pastry or sweet crumb crust, or the like.

SUMMARY OF THE INVENTION

One embodiment of the Applicant's invention is a process for producing a complete, ready-to-use, premium quality cheesecake filling mix that is storable at refrigerated or frozen temperatures for long periods of time prior to use. The process provides an agitated mixture of cream, sugar, eggs, milk, and nonfat dry milk, in which the amount of cream is equal to at least one third of the weight of the final product, and adds to the mixture a premixed stabilizing component which includes sodium caseinate, salt, modified starch, locust bean gum, mono and diglycerides, xanthan gum, sodium tripoly phosphate, and potassium sorbate. After pasteurization and homogenization, the mixture is cooled and acidied with citric, phosphoric and acetic acids in water. After agitation, the mixture is refrigerated or frozen until ready for use.

Another embodiment of the Applicant's invention is a complete, ready-to-use cheesecake filling mix that upon aeration and baking produces a premium quality cheesecake dessert filling, comprising a homogeneous mixture of milk, cream, whole eggs, sugar, nonfat dry milk, sodium caseinate, salt, modified starch, locust bean gum, xanthan gum, mono and diglycerides, sodium tripoly phosphate, citric acid, phosphoric acid, acetic acid and water, that is storable for long periods of time at refrigerated or frozen temperatures prior to use.

It is an object of the present invention to provide a complete, ready-to-use cheesecake mix product that is storable for long periods of time at refrigerated or frozen temperatures and that produces a premium quality cheesecake filling.

It is a further object of the present invention to provide a complete, ready-to-use premium quality cheesecake filling mix product that is storable at refrigerated or frozen temperatures for an extended period of time without product degradation.

It is a further object of the present invention to provide a complete, ready-to-use premium quality cheesecake filling mix that needs only to be aerated by whipping before being placed directly into a suitable cheesecake dessert crust for baking.

Related objects and advantages of the Applicant's novel cheesecake filling mix product and process for producing the same will be evident from the following detailed description.

DESCRIPTION OF THE PREFERRED EMBODIMENTS

A complete, ready-to-use cheesecake filling mix product that is storable for long periods of time at refrigerated or frozen temperatures and that produces a premium quality cheesecake dessert filling is preferrably prepared by a process that includes the following steps. Percentages that follow are weight percents.

Whole milk (butterfat content of about 3.25%) and whole cream (butterfat content of about 40%) are added to a processing vat. The amount of cream used is at least one third of the total weight of the final product, and preferably about one half. The total of both cream and milk is preferably at least one half of the total weight of the final product.

To the cool mixture of milk and cream within the vat, which mixture has been placed under good agitation, are added sugar and nonfat dry milk. Additionally a whole egg base containing cream, sugar, whole eggs, lemon juice, vanilla, potassium sorbate and an antifoam agent (a water diluted 30% silicone defoamer, such as, for example, Dow Antifoam AF made by Dow Corning Corporation, Midland, Mich. ) is added. A cheesecake powder is also added through a powder funnel, or the like, and is composed of sodium caseinate, salt, modified starch, locust bean gum, xanthan gum, mono and diglycerides, sodium tripoly phosphate, potassium sorbate, and a flavor as desired, such as a diacetyl containing flavor additive.

The resulting mixture is then batch pasteurized, or alternatively pasteurized utilizing an HTST (high temperature, short time) process, and is then homogenized. The pasteurized and homogenized mixture is then cooled from the pasteurization and homogenizing temperatures to ambient temperature.

To the cooled resulting mixture is added a mixture of citric, phosphoric, and acetic acids in water, together with any desired natural or artificial flavors. Agitation is continued until the resulting mixture acquires a smooth consistency, after which the mixture product is suitably packaged, and is either refrigerated or frozen until it is to be used. In this refrigerated or frozen state the mixture product is a complete, ready-to-use cheesecake dessert filling mix that will produce a premium quality cheesecake dessert filling.

In place of the conventional cream cheese and sour cream ingredients incorporated into many conventional premium quality cheesecakes, Applicant's novel cheesecake dessert filling mix utilizes as base constituents the primary ingredients that would otherwise be utilized to produce quality cream cheese and sour cream.

For the purpose of promoting a better understanding and to further illustrate the Applicant's invention, reference will now be made in the Example below to the preferred product and process of the invention herein disclosed, but no limitation of the scope of breadth of Applicant's invention is thereby intended by way of presentation of this specific example.

EXAMPLE 1

The Applicant's novel cheesecake filling mix is prepared utilizing readily available bakery items (milk, nonfat dry milk, cream and sugar) and three additional components (Whole Egg Base, Cheesecake Powder, and Cheesecake Liquid) with ingredients in the approximate weight percents listed (and wherein BF means percent butterfat by weight):

TABLE 1

| Ingredients | Bakery Items | Whole Egg Base | Cheesecake Powder | Cheesecake Liquid | TOTAL |
|---|---|---|---|---|---|
| Milk (3.25% BF) | 15.80 | | | | 15.80 |
| Nonfat Dry Milk | 4.63 | | | | 4.63 |
| Cream (40.00% BF) | 52.57 | 1.16 | | | 53.73 |
| Sugar (dry) | 1.10 | 12.72 | | | 13.82 |
| Whole eggs | | 7.75 | | | 7.75 |
| Lemon Juice | | 0.08 | | | 0.08 |
| Vanilla | | 0.01 | | | 0.01 |
| Antifoam Agent | | (.0008) | | | Trace |
| Potassium Sorbate | | 0.02 | .05 | | 0.07 |
| Sodium Caseinate | | | 1.79 | | 1.79 |
| Salt | | | 0.37 | | 0.37 |
| Modified Starch | | | 0.27 | | 0.27 |
| Locust Bean Gum | | | 0.18 | | 0.18 |
| Mono & Diglycerides | | | 0.11 | | 0.11 |
| Xanthan Gum | | | 0.05 | | 0.05 |
| Sodium Triphosphate | | | 0.02 | | 0.02 |
| Flavor | | | 0.12 | 0.01 | 0.13 |
| Water | | | | 0.58 | 0.58 |
| Citric Acid | | | | 0.30 | 0.30 |
| Phosphoric Acid | | | | 0.23 | 0.23 |
| Acetic Acid | | | | 0.08 | 0.08 |
| TOTAL | 74.10 | 21.74 | 2.96 | 1.20 | 100.00 |

The Bakey Items listed in Table 1 are added to a conventional processing vat. The Whole Egg Base of Table 1 is then added. The Whole Egg Base is prepared by blending the listed ingredients and pasteurizing so the blend is suitable for storage. The Cheesecake Powder of Table 1 is then added through a powder funnel or the like, and is a mixture of dry ingredients of potassium sorbate as a preservative, sodium caseinate, salt, modified starch, locust bean gum, mono and diglycerides (for example, Eastman Chemical Myvatex 806K), xanthan gum, sodium tripoly phosphate (sodium triphosphate), and natural and/or artificial flavoring of choice (for example, a diacetyl flavor in the Cheesecake Powder).

The resulting mixture is batch pasteurized to 165°–175° F. for about 30 minutes. Alternatively the pasteurizing step may be by an HTST process at 175°–180° F. at reduced speed of about 25–35 seconds. Due consideration must be given to the possibility of higher than normal back pressures when the mixture as composed to this point, which will have high solids and heavy viscosity, is run through HTST processing equipment.

The pasteurized mixture is then conventionally homogenized at the pasteurization temperatures and at 2500 psi, which ideally would occur in a two stage process, with a first stage at 2000 psi, and a second stage at 500 psi. Alternatively, if only single stage homogenizing equipment is available, homogenization should occur at 1800–2000 psi, or the highest obtainable pressure.

The pasteurized and homogenized mixture is then allowed to cool to about 72° F. The cooled mixture is acidified by adding thereto the Cheesecake Liquid of Table 1, which is a combination of citric acid, phosphoric acid, acetic acid, water and flavor, such as a blend of diacetyl and acetaldehyde. The resulting mixture is agitated until the mixture obtains a smooth consistency, typically with a pH of about 4.6 to 4.7. The resulting mixture product is then a complete and ready-to-use cheesecake dessert filling mix that Applicant has observed to date may be stored either at normal refrigeration temperatures, or frozen to insure maximum storage life, for long periods of time without significant product degradation.

To utilize Applicant's novel cheesecake dessert filling mix, the mix must be thawed thoroughly, if frozen, and then whipped by hand or under power to impart a desirable fluffiness to the cheesecake dessert filling to be produced. The longer the whipping time the fluffier the resulting cheesecake dessert. The whipped mix may then be placed directly into a suitable cheesecake crust. For example, approximately 2 pounds 11 ounces of Applicant's novel mix was thoroughly thawed from a frozen storage state. The mix was then whipped for about 30 seconds and was placed into a 10 inch diameter pie pan having a 5 ounce graham cracker crust lining the pan. The mix and crust were then oven baked at 300° F. for approximately 40-60 minutes, or until the center of the cheesecake filling had reached 165° F., and were then removed from the oven. The oven baked mix and crust were then allowed to cool to room temperature and were then refrigerated overnight before serving. The result was a cheesecake dessert of premium quality.

In an alternative, less preferred, embodiment of Applicant's novel process, the ingredients in the Whole Egg Base of Table 1 may be separately added, without being precombined. When precombined, the sugar content of the whole egg base acts as both a stabilizer and preservative of the whole egg content. The inconvenience of handling and processing whole eggs within the shell in the preparation of the cheesecake filling mix product of the present invention by the Applicant's novel process is eliminated and is more efficiently replaced with a preprocessed and prepackaged Whole Egg Base, such as that commercially available under the trademark BlankeBaer Golden Egg Base of the BlankeBaer & BoweyKrimKo Corporation.

While there has been described above the principles of this invention in connection with a specific formulation, it is to be understood that this description is made only by way of example and not as a limitation to the scope of the invention.

What is claimed is:

1. A process for producing a cheesecake filling mix, comprising the steps of
   (a) providing an agitated mixture of cream, sugar, milk, and nonfat dry milk, in which the amount of cream is equal to at least one third of the weight of the final product, and additionally providing eggs in said mixture;
   (b) adding to said mixture an effective amount of a premixed stabilizing composition which includes sodium caseinate, salt, modified starch, locust bean gum, mono and diglycerides, xanthan gum, sodium tripoly phosphate, and potassium sorbate;
   (c) pasteurizing said mixture,
   (d) homogenizing said mixture,
   (e) cooling said mixture to ambient temperature subsequent to said homogenizing step,
   (f) acidifying said cooled mixture with an effective amount of an acidifying composition including citric, phosphoric and acetic acids in water:
   (g) agitating said mixture for a sufficient additional period of time and degree to impart a smooth consistency to said mixture; and
   (h) refrigerating or freezing said mixture after said agitating until ready for use.

2. The process of claim 1 in which the cream and milk component of the filling constitutes over 50 weight percent of the filling, and the butterfat content of the cream is at least 40 weight percent.

3. The process of claim 1 wherein said eggs are added by way of addition of a premixed stable whole egg base which includes whole eggs, cream, and sugar.

4. The process of claim 3 wherein the constituents of said mixture are present in about the following weight percentages;

| | |
|---|---|
| Milk (3.25% Butter Fat Content) | 15.80 |
| Nonfat Dry Milk | 4.63 |
| Cream (40.00% Butter Fat Content) | 53.73 |
| Sugar (dry) | 13.82 |
| Whole eggs | 7.75 |
| Sodium Caseinate | 1.79 |
| Salt | 0.37 |
| Modified Starch | 0.27 |
| Locust Bean Gum | 0.18 |
| Mono & Diglycerides | 0.11 |
| Xanthan Gum | 0.05 |
| Sodium Triplyphosphate | 0.02 |
| Water | 0.58 |
| Citric Acid | 0.30 |
| Phosphoric Acid | 0.23 |
| Acetic Acid | 0.08 |

5. The process of claim 1 wherein said pasteurizing step occurs at a temperature between 165°–175° F. for about 30 minutes.

6. A cheesecake filling mix produced by the process of claim 1.

7. A complete, ready-to-use cheesecake filling mix product that upon aeration by whipping and upon baking produces a premium quality cheesecake dessert filling, comprising a homogeneous mixture of milk, cream, whole eggs, sugar, nonfat dry milk, sodium caseinate, salt, modified starch, locust bean gum, xanthan gum, mono and diglycerides, sodium tripoly phosphate, citric acid, phosphoric acid, acetic acid and water that is storable for long periods of time at refrigerated or frozen temperatures prior to use without degradation of the mixture wherein the constituents of said mixture are present in about the following weight percentages:

| | |
|---|---|
| Milk (3.25% Butter Fat Content) | 15.80 |
| Nonfat Dry Milk | 4.63 |
| Cream (40.00% Butter Fat Content) | 53.73 |
| Sugar (dry) | 13.82 |
| Whole eggs | 7.75 |
| Sodium Caseinate | 1.79 |
| Salt | 0.37 |
| Modified Starch | 0.27 |
| Locust Bean Gum | 0.18 |
| Mono & Diglycerides | 0.11 |
| Xanthan Gum | 0.05 |
| Sodium Triplyphosphate | 0.02 |
| Water | 0.58 |
| Citric Acid | 0.30 |
| Phosphoric Acid | 0.23 |
| Acetic Acid | 0.08 |

8. A process for producing a cheesecake filling mix, which does not require the use of pretreated milk products such as sour cream, cream cheese, or the like and comprising the steps of
   (a) providing an agitated mixture of cream, sugar, milk, and nonfat dry milk, in which the amount of cream is equal to at least about one half of the weight of the final product, and additionally providing eggs in said mixture;
   (b) adding to said mixture an effective amount of a premixed stabilizing composition which includes sodium caseinate, salt, modified starch, locust bean gum, mono and diglycerides, xanthan gum, sodium tripoly phosphate, and potassium sorbate;
   (c) pasteurizing said mixture,
   (d) homogenizing said mixture,
   (e) cooling said mixture subsequent to said homogenizing step, and
   (f) acidifying said cooled mixture with an effective amount of an acidifying component including citric, phosphoric and acetic acids in water.

9. The process of claim 8 which additionally includes the step of refrigerating or freezing said mixture after said agitating until ready for use.

* * * * *